(12) United States Patent
Thirthala et al.

(10) Patent No.: US 8,218,913 B1
(45) Date of Patent: Jul. 10, 2012

(54) IDENTIFYING A FRONT PAGE IN MEDIA MATERIAL

(75) Inventors: Sriram Thirthala, Maharashtra (IN); Krishnendu Chaudhury, Bangalore (IN)

(73) Assignee: Google Inc., Mountain View, CA (US)

( * ) Notice: Subject to any disclaimer, the term of this patent is extended or adjusted under 35 U.S.C. 154(b) by 1002 days.

(21) Appl. No.: 12/190,176

(22) Filed: Aug. 12, 2008

(51) Int. Cl.
*G06K 9/00* (2006.01)
(52) U.S. Cl. ......... 382/317; 358/408; 358/402; 382/181
(58) Field of Classification Search .................. 382/181, 382/317
See application file for complete search history.

(56) References Cited

U.S. PATENT DOCUMENTS

| | | | |
|---|---|---|---|
| 7,424,129 B2 * | 9/2008 | Hull et al. | 382/100 |
| 7,428,321 B1 * | 9/2008 | Shah et al. | 382/118 |
| 2007/0071290 A1 * | 3/2007 | Shah et al. | 382/118 |
| 2007/0136259 A1 * | 6/2007 | Dorfman et al. | 707/3 |
| 2008/0107338 A1 * | 5/2008 | Furmaniak et al. | 382/176 |
| 2009/0092322 A1 * | 4/2009 | Erol et al. | 382/224 |
| 2009/0167760 A1 * | 7/2009 | Wang et al. | 345/423 |

OTHER PUBLICATIONS

Liu et al., "Newspaper Headlines Extraction from Microfilm Images," IEEE, 2002, pp. 208-211.

* cited by examiner

*Primary Examiner* — Hadi Akhavannik
(74) *Attorney, Agent, or Firm* — Sterne, Kessler, Goldstein & Fox P.L.L.C.

(57) ABSTRACT

The present invention relates to systems and methods for identifying front pages from images representing media. In an embodiment, a system for identifying at least one front page within an image representing media is provided. The system includes a matcher, an aggregator and a reviewer. In another embodiment, a method for identifying at least one front page within an image representing media is provided. The method includes comparing each page to matching criteria to produce a matching confidence score. The method also includes aggregating, as front page candidates, each page having a matching confidence score that exceeds a matching confidence score threshold. The method further includes receiving decision information and identifying front pages from front page candidates based upon the decision information. According to another embodiment, the matching criteria may comprise at least one local, affine invariant feature point.

25 Claims, 4 Drawing Sheets

IDENTIFYING A FRONT PAGE IN MEDIA MATERIAL

BACKGROUND

1. Field of the Invention

Embodiments of the present invention relate to computer-aided analysis of media material.

2. Background Art

Computers can be used to perform or aid analysis of documents and printed material. For instance, techniques and systems have been developed to identify blocks of media material, such as columns in a newspaper, from text and images in a document. The identification of other portions of media material can be important in many document imaging applications. For example, the identification of lines, gutters and other intervening items may aid in the analysis of media material.

Media material may be analyzed for electronic storage and user searches. Media material to be analyzed often exists in an archived format. For example, archived newspapers are typically analyzed from a sequence of media images scanned from microfilm, where newspaper edition boundaries are not marked. However, it is necessary to associate edition dates with indexed articles. Optical character recognition (OCR) based attempts to recover the date from the images are often inadequate and frequently fail to extract the correct date.

Other problems exist to make it difficult to match and organize media images. Media images may not be scaled or rotated correctly as a result of a defect in the scanning process. In addition, portions of images may be missing, smeared, or smudged. In such cases, pixel matching may not work because of slight variations or an imperfect orientation of the media page on the image. Character recognition products often classify poorly scanned text as images. Furthermore, media mastheads may change in size, may be unidentifiable due to scanning, or may be overlooked entirely.

BRIEF SUMMARY

Embodiments of the present invention relate to systems and methods for identifying a front page from a media image. According to an embodiment, a system for identifying a front page from a media image is provided. The system includes a matcher and an aggregator. The matcher is configured to receive a media image having media pages and compare each of the media pages to matching criteria to produce a matching confidence score for each media page. The aggregator is configured to aggregate front page candidates from media pages having a matching confidence score that exceeds a confidence score threshold. The system may further include a review aggregator configured to identify front pages from the front page candidates.

According to another embodiment, a computer-implemented method of identifying a front page within an image representing media having at least one page is provided. The method includes comparing each page of the image to matching criteria to produce a matching confidence score for each page. The method also includes aggregating, as front page candidates, each page having a matching confidence score that exceeds a matching confidence score threshold. The method may further include receiving decision information and identifying front pages from the front page candidates based upon the decision information. According to another embodiment, the matching criteria may comprise at least one local, affine invariant feature point. According to a further embodiment, the method may also include obtaining a date from each identified front page and assigning the date to the pages associated with an identified front page.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

Figure 1:
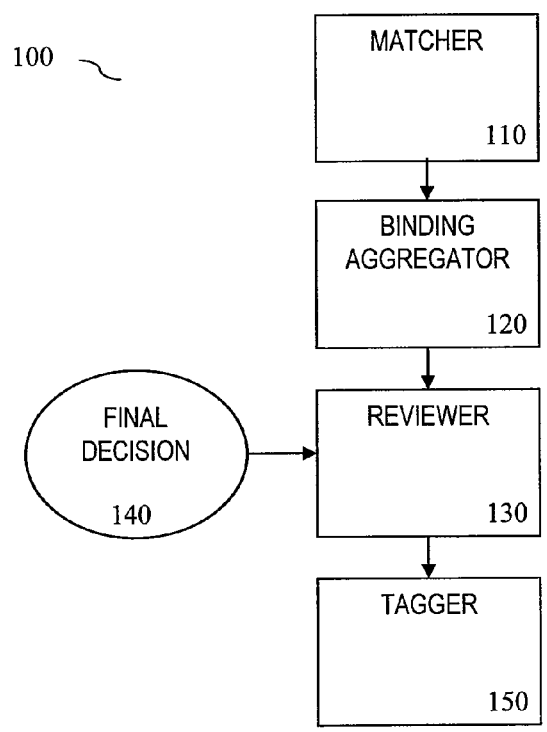
FIG. 1 illustrates a system for identifying a front page, according to an embodiment of the present invention.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments described herein refer to systems and methods for identifying a front page from a media image. Front page identification provides a solution to the inadequate dating and organizing of media material. Media material may include, but is not limited to, newspapers, magazines, catalogues, brochures, pamphlets, and other types of print media. Media material may be scanned from an archived format. Such formats may include sequences of media images on microfilm, microfiche, electronic documents, or from any other archiving means. A media image may include one or more media pages. Once front pages are identified in a media image or sequence of media images, the sequence may be segmented into editions. Everything between a front page and the next front page may be considered an edition. As editions in an archived format, such as a microfilm roll, occur in sequence, information about the beginning and ending dates in a roll may be used to fill in the intermediary dates. If beginning and ending dates in a roll are entered, manually or automatically, a system can then assign dates to the media pages in a roll.

Front pages of media material, such as newspaper editions, can be identified. Two front pages of the same newspaper will have very different headlines and stories, but they will have one large common object, such as a newspaper title. The title will appear conspicuously on the page, usually in large or stylized fonts (e.g., "The Times"). According to an embodiment, a front page of the newspaper may be selected from among the pages of the media material to serve as a template page. A template page may be selected manually or automatically. Each page of the media material may be compared to this template page to identify front pages. However, matching two page images based on a common title, with possible page defects, can be difficult. Simple Optical Character Recognition (OCR) almost always fails to recognize the newspaper name (masthead) due to the stylized rendition and/or the large font size of the masthead. In addition, portions of pages may be missing (occlusion/disocclusion), smeared or smudged. In such cases, simple pixel matching, such as two dimensional image correlation, will rarely work because of slight variations in gray levels or an imperfect orientation of the media page in the media image. Better methods for front page identification have been needed. Embodiments of the present invention include methods and systems for identifying a front page from a media image. The term "front page" is used broadly herein to refer to a first page, cover page, or other page in a media material having one or more feature points indicative of a leading page. A front page can include but is not limited to a page having a masthead. Aspects of the present invention include using matching criteria to identify a front page of a newspaper in the presence of page defects and background clutter.

FIG. 1 illustrates an exemplary system 100 for identifying at least one front page within an image representing media, according to an embodiment. System 100 includes matcher 110, aggregator 120, reviewer 130 and tagger 150. System 100 (including its components) can be implemented to run on any type of processing device including, but not limited to, a computer, workstation, distributed computing system, embedded system, stand-alone electronic device, networked device, mobile device, set-top box, television, or other type of processor or computer system. Matcher 110, aggregator 120, reviewer 130 and tagger 150 may be coupled together directly or over a network.

Matcher 110 may be configured to receive the image representing media having at least one page. Matcher 110 may also be configured to compare each page to at least one matching criterion to produce a matching confidence score for each page. A matching confidence score may be any representation relating to how well a page compares to matching criteria.

Matching criteria may include one or more feature points. Matching criteria may also include descriptors of feature points. Feature points may be identified from a template page, according to an embodiment. A template page may include a sample page. A template may include a portion of a page. A template page may include a front page. A front page may be identified from a media image. A template page may be identified manually, semi-automatically, or automatically. According to another embodiment, matching criteria may include a template page. Matching criteria may include any set of reference points or descriptors to be used for comparison. According to an embodiment, matching criteria may also include a set of rules.

Feature points may include any mark, location, portion of an image, group of pixels, or identifying feature for purposes of image analysis. Feature points may also be local, or pertain to certain locations of media material. According to another embodiment, feature points may include affine invariant feature points. Affine invariant feature points do not require that the image have a specific global orientation. Affine invariant feature points are analyzed independently and are thus more immune to defects in scanning such as image rotation, scaling, sizing, or translation.

Figure 3:
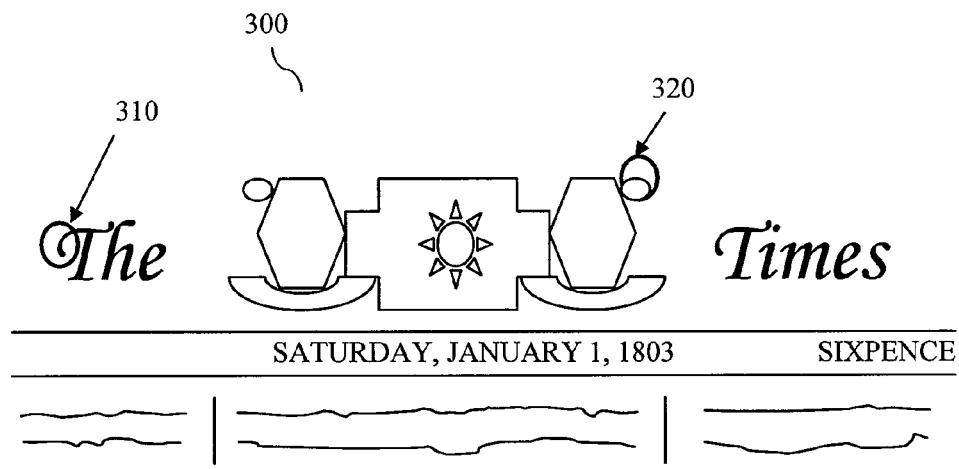
FIG. 3 illustrates example media material used in the identification of a front page, according to exemplary embodiments of the present invention.

For example, FIG. 3 shows media material having a masthead 300. Local feature point 310 includes a corner of the first letter "T" in "The Times". Second local feature point 320 includes a portion of the right top corner of a decorative image between "The" and "Times". Local feature points 310 and 320 are distinguishable when considered independently. By contrast, other local points, such as those located in whitespace, may not be. Having a sufficient number of effective local feature points will assist with occlusion and disocclusion, where portions of an image may be missing, smudged, torn, smeared, marked, or suffering from any other scanning, printing, or handling defect. A match may still be found if enough local feature points are used.

According to a further embodiment, newspaper titles on different newspaper front pages may be related by affine transforms. That is, all affine invariant feature points from one image should be transformable into their respective matching feature point in the other images via a single affine transformation (within a margin of error). According to another embodiment, a RANSAC (Random Sample Consensus) approach may be used to estimate such a transformation. If no single transformation can be found that transforms every feature point from one image to its corresponding feature point in the other image, without exceeding the bounds of error tolerance, a mismatch should be returned by the system.

According to another embodiment, feature points may be affine invariant. Descriptor vectors for such affine invariant features may also be computed. For instance, a local feature point of a front page may be identified. In another image of the front page, which could be scaled, rotated, or translated with respect to the first front page, a local feature point at the same corresponding position may be located. The feature descriptor vectors would be the same, within a margin of error.

According to a further embodiment, fewer irrelevant feature points may be identified by whitening certain portions of a media page. According to another embodiment, feature points and descriptors may be computed for each candidate front page. Other embodiments may use different feature point identification or description schemes.

Feature points may be identified by manual input, automatic algorithms, and/or self-learning. A local feature detector may be used to identify local features and/or to compute descriptors for those local features. Examples of local feature detectors, among others, include Hessian Affine, Difference of Gaussian Detector (DoG), or Harris Affine local feature detectors. Descriptors may include, among others, scale-invariant feature transform (SIFT) or gradient location and orientation histogram (GLOH) descriptors.

Figure 4:
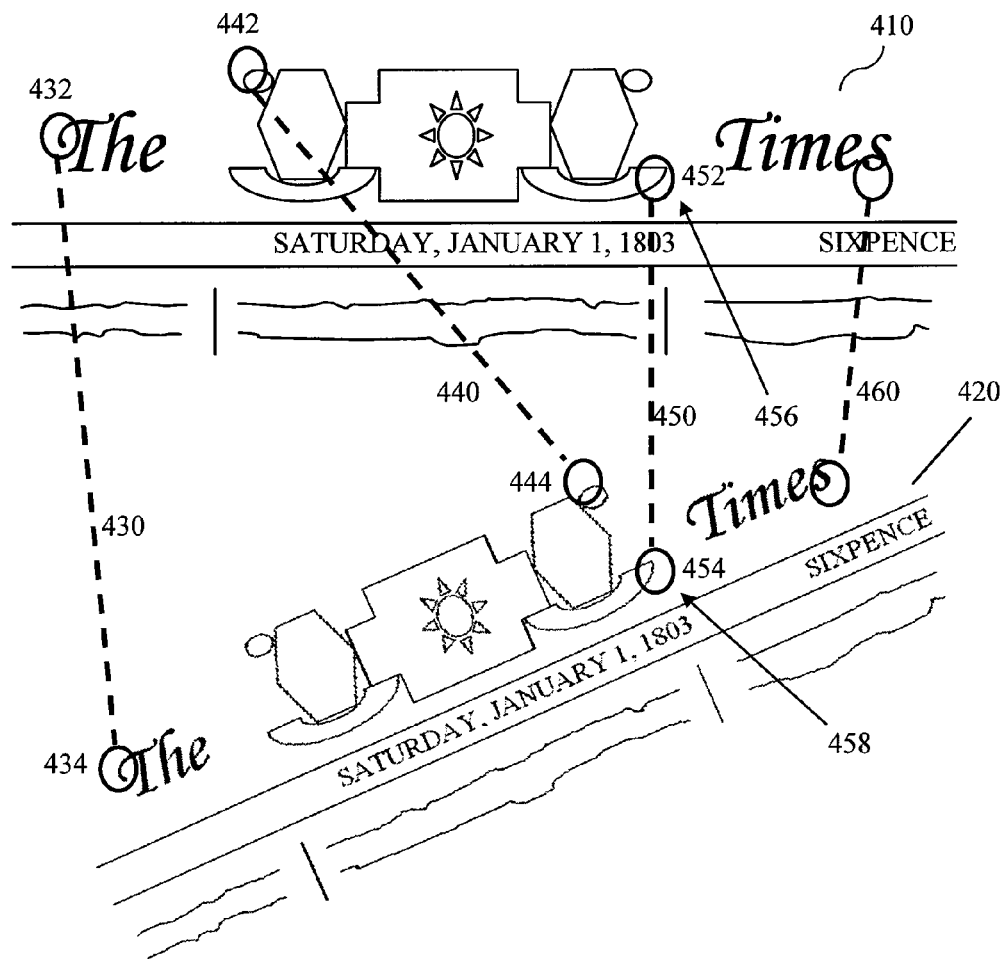
FIG. 4 illustrates example media material used in the identification of a front page, according to exemplary embodiments of the present invention.

According to an embodiment, matcher 110 may be configured to identify a set of matching feature points. These matching feature points may form a feature point pair. A pair may include a feature point from a template front page and a feature point from a candidate front page. For example, FIG. 4 shows a template front page masthead 410 and a slightly rotated candidate front page masthead 420. Feature point pairs 430-460 are shown in FIG. 4. All pairs of feature points may be examined to find a maximal set of "best match" pairs. If this maximal set is too small, a match may be rejected. According to another embodiment, finding a set of best match pairs may involve considering differences between identified feature points of a pair. According to a further embodiment, finding best match pairs may involve finding feature points that are close to or closest to feature points of a template front page from a list of points.

According to an embodiment, the quality or score of a match between a pair of feature points may be measured or aided by certain metrics between feature points. Metrics may include Euclidean distances. For example, the distance between feature points 432 and 452 may be measured compared to the distance between feature points 434 and 454. In this case, since the measured distances are similar, a higher matching score would be produced. However, the distance between feature points 432 and 442 is much different than the distance between feature points 434 and 444 and a lower matching score would be produced. Such differences may also affect how some feature points are used to determine a matching score. According to a further embodiment, an affine transformation between two sets of feature points may be estimated via RANSAC. If the fitting error for an estimated affine transformation is too large, the match may be rejected. According to another embodiment, additional constraints may be imposed on a transformation. For example, if a scale factor is outside a range (e.g., [0.7, 1.4]), the match may be rejected. Matcher 110 may also produce a matching confidence score based upon the quality of a match, a score, a distance, an estimate, constraints, a scale factor, or any other determination relating to how feature points are matched and measured.

Other global consistency metrics may be used. According to an embodiment, matching may be performed using additional geometric constraints. A list of correspondences may be used. For example, a matching feature point for one corresponding feature, like the notch in a letter of a title, may be found. Analysis may then be performed for a certain distance to the right and then a certain distance downward. If another corresponding feature, such as a corner of another letter in a newspaper title, is found where it is expected, then the feature point is verified or the confidence score is increased. This analysis may be adjusted to accommodate scaling or rotation of a media page in a media image. According to another embodiment, images may also be scaled up or down to assist in analysis. According to yet another embodiment, median least squares may be used.

Another example of feature point matching is provided, according to an embodiment. A local feature detector, such as a Laplacian of Gaussian (LoG) detector or a Difference of Gaussian (DoG) detector may be used to identify a number of feature points in a media page. Feature points may include local features, such as those identified as feature points 452 and 454 in FIG. 4. These feature points may be descriptors identified with an algorithm such as scale-invariant feature transform (SIFT).

According to this embodiment, once feature points are identified in a media page, they may be matched with feature points in a template page. However, sometimes there are defects on the media page. Certain steps may be taken to help mitigate these defects. For example, if there are occlusions near feature points 452 and 454, the area around feature points 452 and 454 may be whitened to eliminate any occlusional clutter.

Analysis may then be performed for the feature points, according to this embodiment. Different types of analyses may be performed, including for the area directly around the feature points. For example, analysis may be performed on the area below feature point 452 of the template page, wherein a portion of straight line 456 is found. Line 456 is one of the parallel lines that separates the printed date and price of the paper from the masthead and articles. The portion of line 456 below feature point 452 is a corresponding feature that may help verify feature points 452 and 454. This analysis may also be performed for feature point 454 of the media page and for the area directly below. There is a straight line 458 below feature point 454. However, it is oriented at an angle due to a rotational defect of the media page.

To handle the rotational difference of line 458, an affine transformation may be performed on this pair of feature points. This may include a rotational transform of feature point 454 to rotate or reorient the portion of line 458 below feature point 454 to better match the feature point of 452 and its surrounding area. As a result, this feature point pair may receive a higher matching score. According to a further embodiment, this affine transformation may be estimated using RANSAC. The transformation may be used because it is an inlier (as opposed to an outlier) in the model developed using RANSAC.

This feature point pair may be included in a set of matching pairs, according to an embodiment. This set of matching pairs may be analyzed in order to assign a score to the media page as a whole. If the media page has a sufficient matching score, the media page may advance as a candidate front page. This candidate front page will then be aggregated with other front page candidates.

System 100 includes aggregator 120. Aggregator 120 may be configured to aggregate, as front page candidates, each page having a matching confidence score that exceeds a matching confidence score threshold. This threshold may be determined manually or automatically. This threshold may also be re-calibrated. Front page candidates may be aggregated from electronic images, scanned images, or data extracted by optical character recognition (OCR). According to another embodiment, front page candidates may be recorded with their matching confidence scores.

System 100 includes reviewer 130. Reviewer 130 may be configured to receive decision information. Decision information may include a final decision 140 on whether a front page candidate is a front page. According to an embodiment, decision information may be generated manually by human decision. Reviewer 130 may be configured to enable a user to view and/or vote on front page candidates. A user may then input his or her votes on whether a front page candidate is an actual front page. For example, majority voting may be used to make a human decision. In this case, a front page candidate would be identified as an actual front page when it receives votes from a majority of users (reviewers), or a predetermined number of users. Such a human decision may be made with or without the further assistance of computer-aided analysis. According to another embodiment, decision information may be generated all or in part by computer analysis. Decision information may also be generated automatically or in combination with human analysis. Review 130 may be configured to identify front pages from front page candidates based upon decision information. According to a further embodiment, this identification of an actual front page may also be based upon a combination of decision information and matching confidence scores. According to another embodiment, identification may involve other data, modules or methods.

System 100 includes tagger 150. Tagger 150 may be configured to tag, physically mark, or electronically mark front page candidates that have been identified as front pages. Tagging may be done in many different ways, as appreciated by those skilled in the art(s) of document analysis or imaging.

Figure 2:
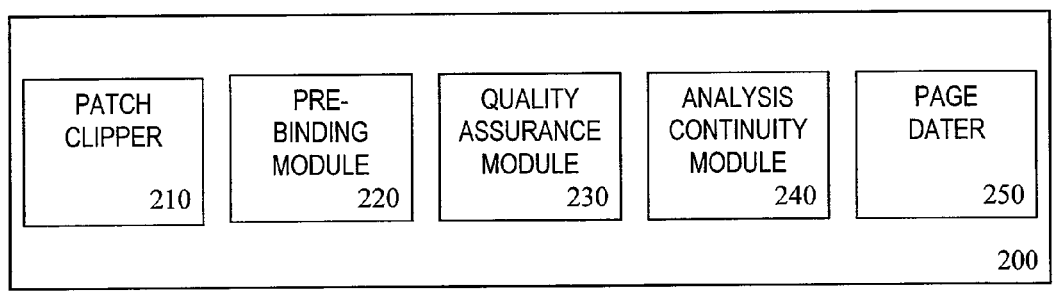
FIG. 2 illustrates a system for assisting the identification of a front page, according to an embodiment of the present invention.

System 100 may be assisted by identification support system 200, as shown in FIG. 2, according to an embodiment. System 200 may include patch clipper 210, pre-binding module 220, quality assurance module 230, analysis continuity module 240, and page dater 250. Components of system 200 may be coupled together directly or over a network. According to another embodiment, any component of exemplary system 200 may exist separately from system 200. According to a further embodiment, any combination of the components shown in FIG. 2 may or may not be used.

Patch clipper 210 may be configured to select patches of a page, rather than a whole template, for a comparison with matching criterion. Patches may be of various shapes and sizes. Patches may also be selected for being flawless or the proper size. Patches may include distinguishable places. For example, corners of a letter may be broken down into patches. Other examples of patches may include areas related to a list of correspondences, or locations that correspond to other locations. Patches for matching may be selected for various other strategic reasons. According to an embodiment, patch clipper 210 may work in cooperation with matcher 110.

Other components of system 200 may assist in identifying front pages. Pre-binding module 220 may be configured to enable a user to identify an image, among images representing media, having at least one front page candidate. This image may be used as a template. It need not be the first such image in a series of images. Pre-binding module 220 may also be configured to allow a media image to be marked as to whether certain data, like a masthead, is visible or not.

Quality assurance module 230 may be configured to enable a user to receive at least one request for input. For example, one or more questions or decisions to be made may be sent to a user or system module for further analysis or more information. The human or system module may provide an answer or additional information to quality assurance module 230. An answer may also be provided regarding a date. Date recognition using OCR may reduce the number of questions. Quality assurance module 230 may be configured to provide an output for each front page candidate. Quality assurance module 230 may also be configured to store this additional information. Quality assurance module 230 may comprise a GUI or may be web-based. According to an embodiment, quality assurance module 230 may work in cooperation with reviewer 130.

Analysis continuity module 240 may be configured to recalibrate a matching confidence score threshold. It may recalibrate the threshold based upon information relating to the matching of feature points of related pages. It may also use information about pages that are not quite front page candidates or front page candidates that are not quite front pages. Analysis continuity module 240 may also consider information from the pages in between front pages. For example, it may identify discontinuities, missed front pages or missing pages in between the front pages. According to an embodiment, analysis continuity module 240 may work in cooperation with matcher 110, aggregator 120, quality assurance module 230 and/or reviewer 130.

Page dater 250 may be configured to obtain a date from each identified front page. Page dater 250 may also be configured to assign the date to the pages associated with an identified front page. According to an embodiment, page dater 250 may be performed with the assistance of an OCR system. According to another embodiment, page dater 250 may be performed with the assistance of human input. According to a further embodiment, page dater 250 may work in cooperation with aggregator 120 or tagger 150.

Figure 5:
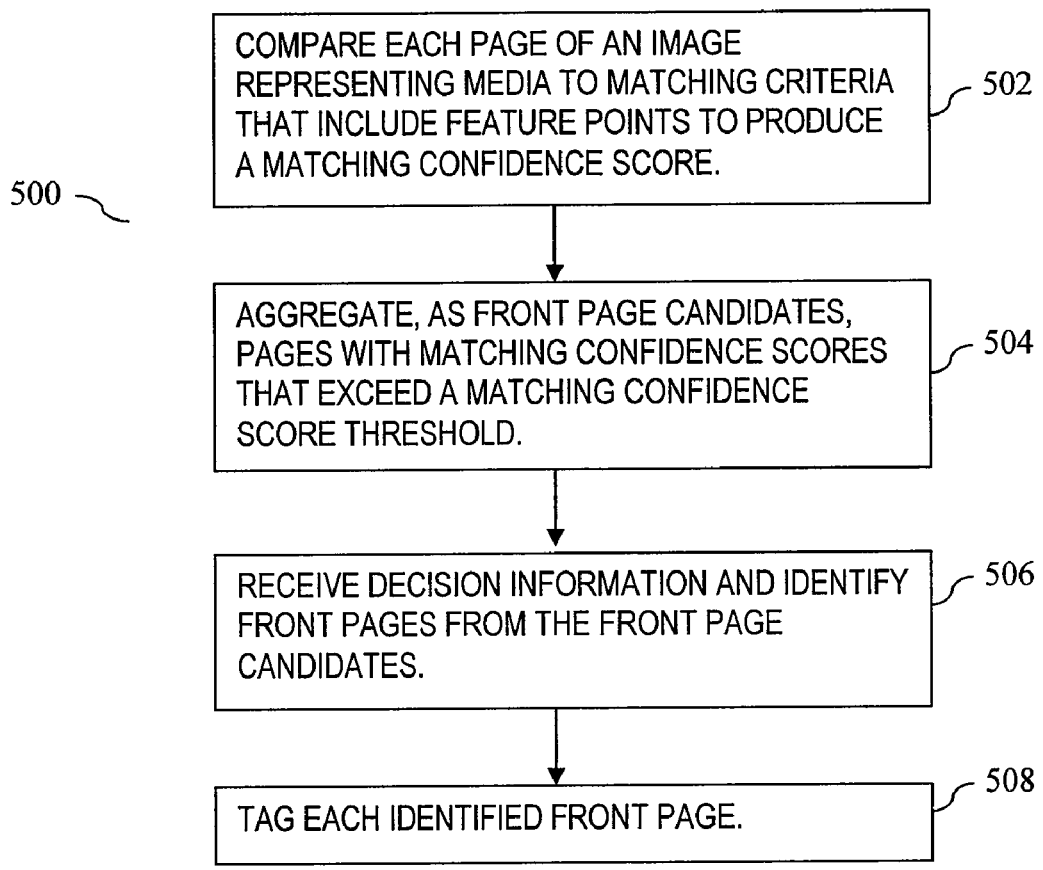
FIG. 5 shows a flowchart illustrating a method for identifying a front page, according to an embodiment of the present invention.

FIG. 5 illustrates an exemplary method 500 for identifying at least one front page within an image representing media having at least one page (steps 502-508), according to an embodiment. For brevity, method 500 will be described with reference to system 100 but is not necessarily limited to this system. In step 502, each page of an image representing media is compared to matching criteria that include feature points in order to produce a matching confidence score. This may be performed by matcher 110. Pages with matching confidence scores that exceed a matching confidence score threshold are aggregated as front page candidates in step 504. This may be performed by aggregator 120. Decision information 140 is received in step 506 and is used to identify front pages from the front page candidates. This step may be performed with the assistance of reviewer 130. In step 508, each identified front page is tagged. This may be performed by tagger 150.

Figure 6:
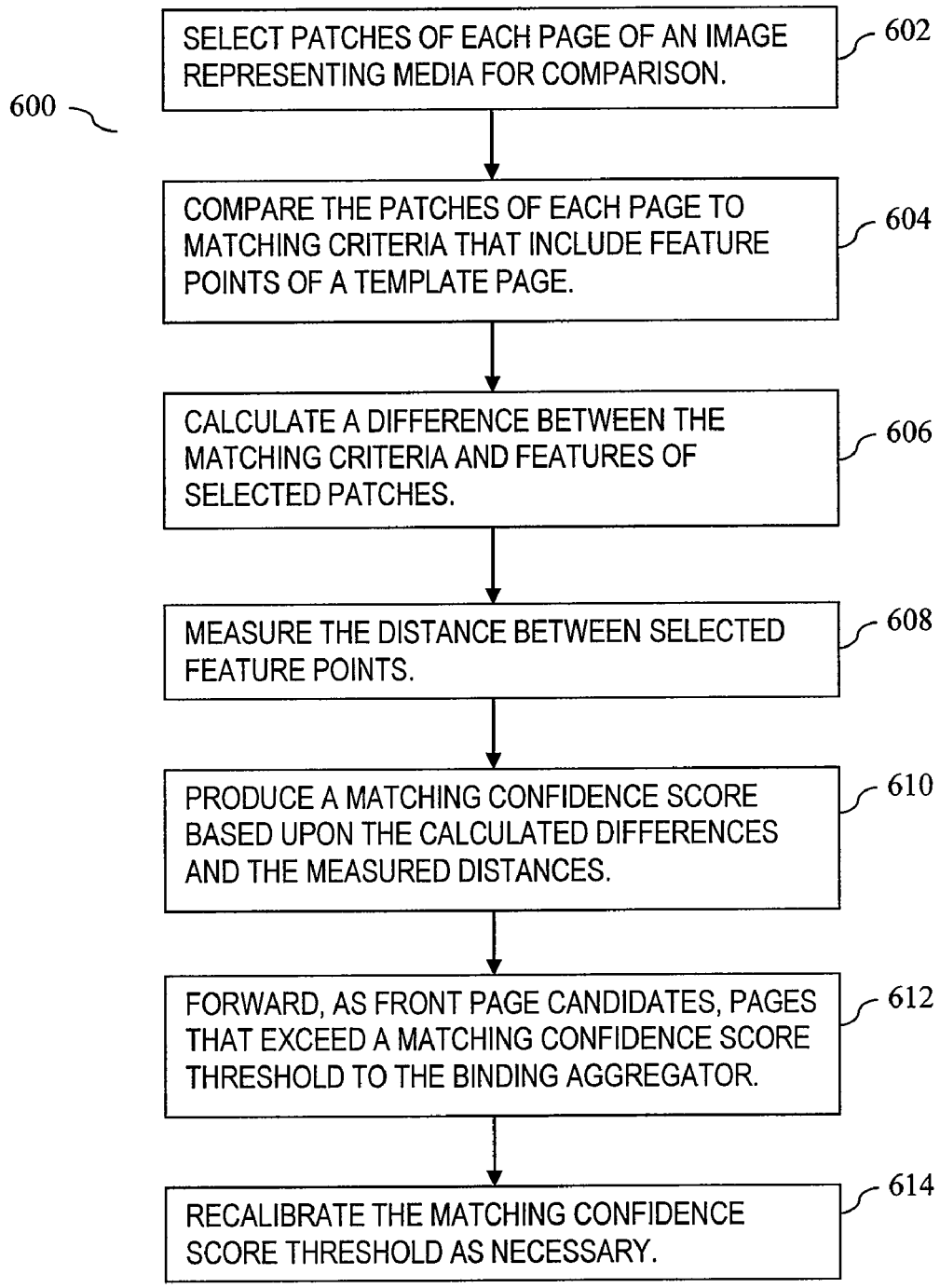
FIG. 6 shows a flowchart illustrating another method for identifying a front page, according to an embodiment of the present invention.

FIG. 6 illustrates another exemplary method 600 for identifying at least one front page (steps 602-614) with additional steps that may be performed, according to an embodiment. For brevity, method 600 will be described with reference to systems 100 and 200 but is not necessarily so limited. In step 602, patches of each page of an image representing media may be selected for comparison. This may be performed by patch clipper 210. Patches of each page may be compared to matching criteria in step 604. The matching criteria may include feature points or descriptors of feature points. These feature points may be identified from a template page. These feature points may be extracted from a template page. These feature points may be identified in a manner described above. In step 606, differences or similarities between matching criteria and features of selected patches are calculated. If necessary, an affine transformation may be performed to verify feature point matches. Other steps may be performed to help clarify the feature points to be analyzed.

In order to further verify feature point matches, global consistency metrics may be used. For example, a distance between selected feature points is measured in step 608. This measurement may be used as it may be effective in analyzing affine feature points. If the page is rotated, this measurement may still be consistent. Other global consistency metrics may be used to handle other defects, including translation and scaling defects. In this embodiment, a matching confidence score is produced in step 610 based upon the calculated differences and the measured distances.

In step 612, pages that exceed a matching confidence score threshold are forwarded, as front page candidates, to aggregator 120. Steps 604-612 may be performed by matcher 110. A matching confidence score threshold may be recalibrated as necessary, as shown in step 614. For example, the matching score threshold may need to be increased or decreased based upon a frequency of certain matching scores. Recalibration step 614 will help front page candidate selection to become more consistent among a number of media pages or sets of media pages. This step may be performed by analysis continuity module 240. According to another embodiment, this step may also be performed by aggregator 120.

By operating automatically or semi-automatically, front page identification system 100 can be used and scaled to analyze a large amount of media material. In this way, content from the images representing media can be made available locally and remotely over networks to a wide range of users. System 100 can allow users to review text data in media material accessed locally or remotely at libraries, universities, government agencies, businesses, and other sites. System 100 or the results of system 100 can be used in connection with a search engine, web portal, or other web site to allow remote users to review and search media material having layout.

Aspects of the present invention, for example system 100, system 200, method 500 and/or method 600 or any part(s) or function(s) thereof may be implemented using hardware, software, firmware, or a combination thereof and may be implemented in one or more computer systems or other processing systems. Aspects of the present invention may also be implemented in a computer system. A computer system may include, but is not limited to, a computer, workstation, server, mobile device (such as a laptop, mobile phone, smart phone, or personal data assistant), kiosk, game console, set-top box, or television.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for identifying at least one front page within an image representing media having at least one page, comprising:
   a matcher configured to receive the image representing media having at least one page and electronically compare each page to at least one matching criterion to produce a matching confidence score for each page, wherein the at least one matching criterion comprises at least one feature point;
   an aggregator configured to aggregate, as front page candidates, each page having a matching confidence score that exceeds a matching confidence score threshold;
   a reviewer configured to receive decision information and identify the at least one front page from the front page candidates based upon the decision information; and
   an analysis continuity module configured to recalibrate the matching confidence score threshold.

2. A system for identifying at least one front page within an image representing media having at least one page, comprising:
   a matcher configured to receive the image representing media having at least one page and electronically compare each page to at least one matching criterion to produce a matching confidence score for each page, wherein the at least one matching criterion comprises at least one feature point;
   an aggregator configured to aggregate, as front page candidates, each page having a matching confidence score that exceeds a matching confidence score threshold;
   a reviewer configured to receive decision information and identify the at least one front page from the front page candidates based upon the decision information; and
   a page dater configured to obtain a date from each identified front page and assign the date to the at least one page associated with the identified front page.

3. A computer-implemented method of identifying at least one front page within an image representing media having at least one page, comprising:
   electronically comparing each page of the image to at least one matching criterion to produce a matching confidence score for each page, wherein the at least one matching criterion comprises at least one feature point;
   aggregating, as front page candidates, each page having a matching confidence score that exceeds a matching confidence score threshold;
   receiving decision information;
   identifying the at least one front page from the front page candidates based upon the decision information; and
   recalibrating the matching confidence score threshold.

4. A computer-implemented method of identifying at least one front page within an image representing media having at least one page, comprising:
   electronically comparing each page of the image to at least one matching criterion to produce a matching confidence score for each page, wherein the at least one matching criterion comprises at least one feature point;
   aggregating, as front page candidates, each page having a matching confidence score that exceeds a matching confidence score threshold;
   receiving decision information;
   identifying the at least one front page from the front page candidates based upon the decision information;
   obtaining a date from each identified front page; and
   assigning the date to the at least one page associated with the identified front page.

5. The system of claim 1, wherein the at least one feature point comprises a plurality of feature points and the matcher is further configured to measure a distance between two or more of the feature points on the at least one media page to produce the matching confidence score.

6. The system of claim 1, wherein the decision information is based upon majority voting carried out by a plurality of reviewers.

7. The system of claim 1, further comprising a quality assurance module configured to enable a user to receive at least one request for input and provide at least one corresponding output for each front page candidate.

8. The system of claim 2, further comprising a tagger configured to tag each identified front page.

9. The system of claim 2, wherein the at least one feature point comprises at least one local, affine invariant feature point.

10. The system of claim 2, wherein the at least one feature point comprises a plurality of feature points and the matcher is further configured to measure a distance between two or more of the feature points on the at least one media page to produce the matching confidence score.

11. The system of claim 2, wherein the decision information is based upon majority voting carried out by a plurality of reviewers.

12. The system of claim 2, wherein the reviewer is configured to enable a user to view and vote on front page candidates.

13. The system of claim 2, wherein media comprises print media.

14. The computer-implemented method of claim 3, wherein the at least one feature point comprises at least one local, affine invariant feature point.

15. The computer-implemented method of claim 3, wherein the comparing step further comprises measuring the distance between two or more of the at least one feature point on the at least one media page.

16. The computer-implemented method of claim 3, wherein the decision information is based upon majority voting carried out by a plurality of reviewers.

17. The computer-implemented method of claim 3, further comprising:
   receiving at least one request for input for a front page candidate; and
   providing at least one corresponding output for the respective front page candidate.

18. The computer-implemented method of claim 4, further comprising tagging each identified front page.

19. The computer-implemented method of claim 4, wherein the at least one feature point comprises at least one local, affine invariant feature point.

20. The computer-implemented method of claim 4, wherein the at least one feature point comprises a plurality of feature points and the comparing step further comprises measuring the distance between two or more of the feature points on the at least one media page.

21. The computer-implemented method of claim 4, wherein the decision information is based upon majority voting carried out by a plurality of reviewers.

22. The computer-implemented method of claim 4, further comprising selecting patches of the at least one media page for comparison to the at least one matching criterion.

23. The computer-implemented method of claim 22, wherein the comparing step further comprises calculating a difference between at least one matching criterion and a feature of a selected patch of the at least one media page.

24. The computer-implemented method of claim 22, wherein the comparing step further comprises scaling down a selected patch of the at least one media page.

25. The computer-implemented method of claim 4, wherein media comprises print media.

* * * * *